March 1, 1938.　　　H. N. DURHAM　　　2,109,615
GEAR SHIFTER
Filed Aug. 14, 1935　　　2 Sheets-Sheet 1
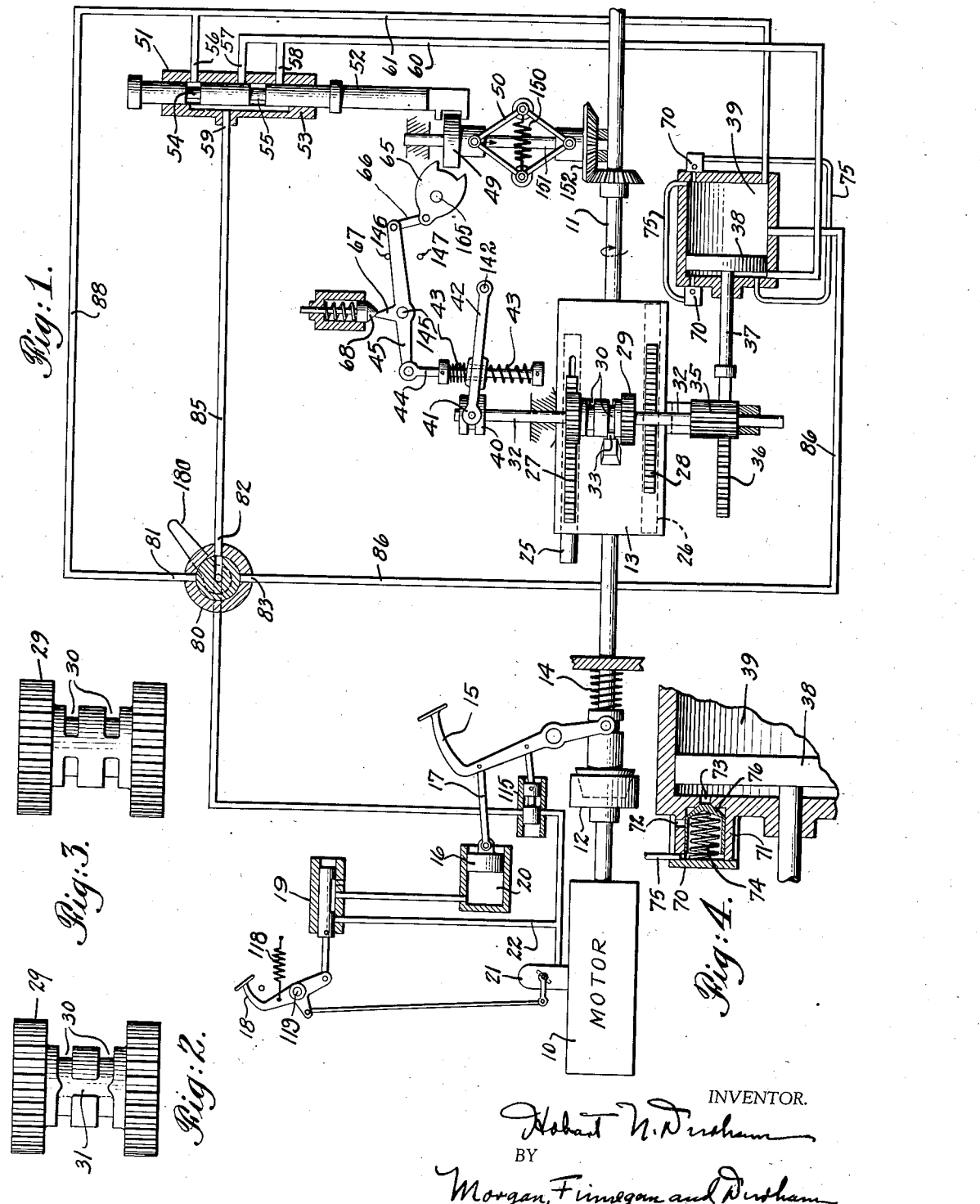
INVENTOR.
Hobart N. Durham
BY
Morgan, Finnegan and Durham
ATTORNEYS

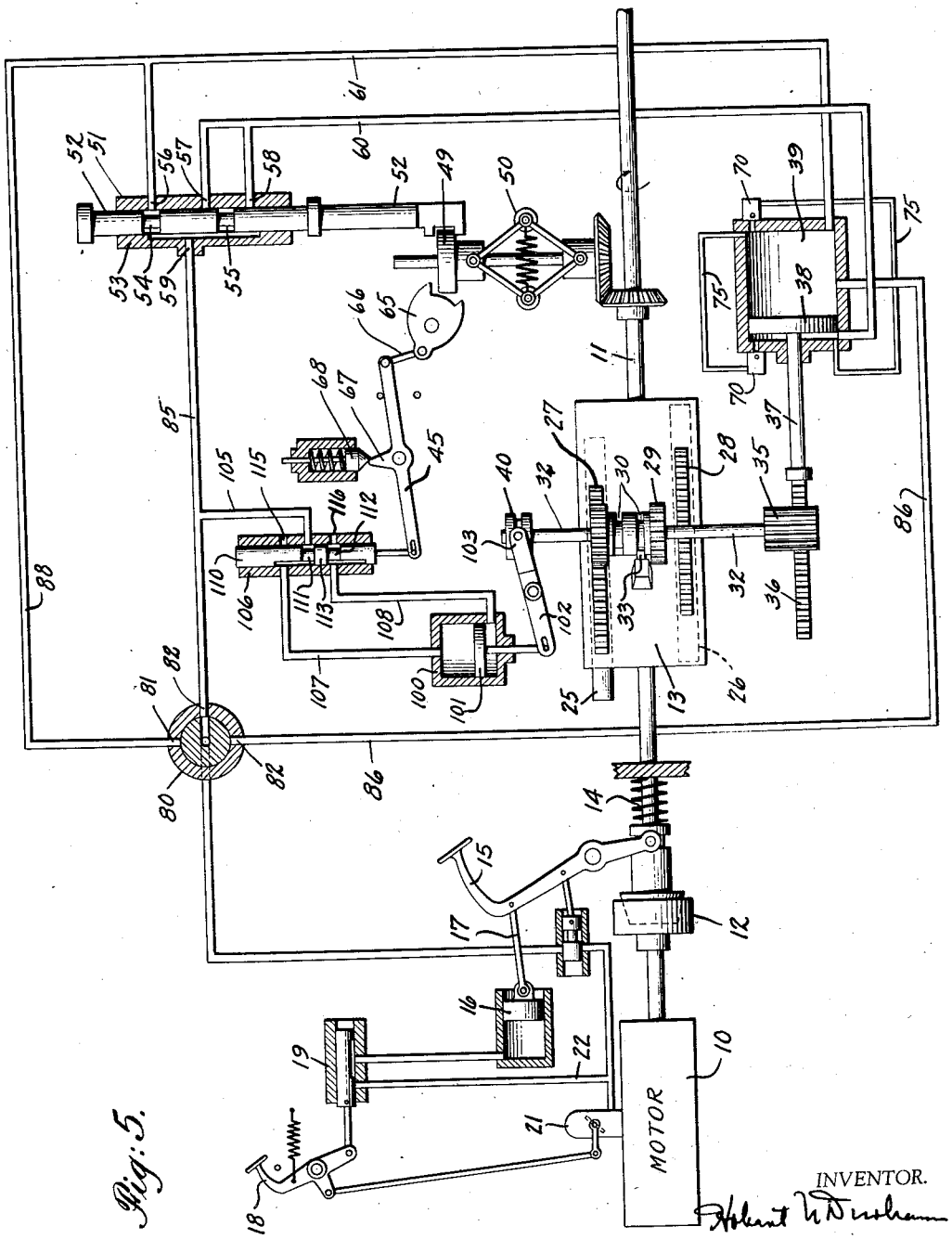

Patented Mar. 1, 1938

2,109,615

UNITED STATES PATENT OFFICE 2,109,615

GEAR SHIFTER

Hobart N. Durham, Munsey Park, N. Y., assignor to Vaco Products, Inc., a corporation of Delaware Application August 14, 1935, Serial No. 36,093

5 Claims. (Cl. 74—336.5)

The present invention relates to automotive vehicles and more particularly to novel and improved fluid-pressure operated gear shifting device for the transmission gearing of such a vehicle.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a diagrammatic plan view of an illustrative embodiment of the present invention, with certain parts shown in section for clarity;

Figures 2 and 3 are detailed side elevations of a part used in the embodiment of Figure 1;

Figure 4 is a fragmentary detailed sectional view of a cylinder valve as utilized in the embodiment of Figure 1; and Figure 5 is a diagrammatic plan view of a modified embodiment of the invention.

The present invention has for its object the provision of an exceedingly simple gear-shifting device for automotive transmissions, and which is particularly adapted for operation by fluid pressure and preferably vacuum. Another object of the invention is the provision of an automatic gear-shifting device for shifting the transmission gears in accordance with vehicle speed which requires only a single vacuum cylinder for its operation. A further object of the invention is the provision of a vacuum operated gear-shifting device in which a single cylinder does all the actual work of shifting the gears from one speed to another while separate means are provided for determining which gears are to be shifted. Another object of the invention is to provide an actuating device for selectively engaging any one of several gear-shifting elements, the engagement thereof with the shifting elements being controlled in accordance with vehicle speed or movement and the shifting movement of the actuating device when engaged with any of said shifting elements also being subject to vehicle speed or movement. Still another object of the invention is to provide an actuating device, preferably vacuum-operated, which is selectively engageable and disengageable with a gear-shifting element, said engagement and disengagement being subject to vehicle speed or motion.

A further and separate object of the invention is to provide a vacuum-operated gear-shifting cylinder operable subject to vehicle speed wherein venting of the cylinder may be automatically effected during operation.

Referring now in detail to the illustrative embodiment of the invention as shown in Figures 1 to 4 of the accompanying drawings, the invention is illustrated as applied to an automobile having three forward and one reverse speeds and power means for the automatic operation of the conventional clutch, and is shown as adapted to shift these gears automatically into the proper speeds as determined by the vehicle speed.

There is provided the conventional internal combustion motor 10 serving to drive a propeller shaft 11 through a clutch 12 and selective transmission gearing 13. A spring 14 serves to maintain the clutch normally engaged, and it may be moved to disengaged position by means of the clutch pedal 15, or the clutch is automatically disengaged by means of a vacuum-operated piston 16 connected to the clutch by means of a link 17. The application of vacuum to the piston 16 is controlled in accordance with the position of the accelerator pedal 18 by means of a valve 19 connected thereto, and vacuum is applied to the cylinder 20 of piston 16 from the intake manifold 21 through line 22. Accelerator 18 is pivoted on pivot 119 and is returned to idling position by spring 118.

As the accelerator pedal 18 is depressed, the clutch operating cylinder 20 is disconnected from the intake manifold 21, thereby permitting engagement of the clutch, until the accelerator pedal is released, closing the throttle and causing movement of the piston 16 as the vacuum is applied to it through valve 19.

The transmission 13 is shown diagrammatically as having one reverse and three forward speeds and the gears for these various speeds are selected by movement of two shifting rods 25 and 26, which are connected to racks 27 and 28, extending parallel thereto and above said rods. As shown in Figure 1, the mechanism is in first speed position and is ready to be shifted to second speed position.

For moving the shifting rods 25 and 26 alternatively from one speed position to another, there is provided a double pinion 29, shown in detail in Figures 2 and 3, adapted to mesh with one or the other of the racks 27 and 28, and having its two gear faces spaced so as to fit between the racks without engaging either rack, or so as to engage either one or the other of the racks. Pinion 29 is provided with a cylindrical portion connecting its two gear portions, and the cylindrical portion is formed with two cylindrical grooves 30 connected together by an axial groove 31, and is fixed to a shaft 32 mounted in suitable bearings for rotary and axial sliding movement above the transmission casing and at right angles to the shifting rods 25 and 26. A finger 33, mounted rigidly on the transmission casing, extends into the grooves 30 and 31, and is so positioned that the pinion 29 can be moved axially with its shaft only when the gear-shifting rods 25 and 26 are both in neutral position, in which case the pinion is moved axially with the finger 33 in groove 31.

For sliding the gear-shifting rods 25 and 26 by oscillation of the pinion 29, a pinion 35 is also mounted on shaft 32 and meshes with a rack 36 forming an extension of piston rod 37 which is rigidly connected to piston 38 moving within the vacuum cylinder 39.

Means are also provided for shifting the pinion 29 axially and for this purpose a collar 40 is mounted at one end of shaft 32 and cooperates with a forked end 41 of a lever 42, pivoted at 142, which is moved by one or the other of springs 43 on rod 44 connected to one end of lever 45, pivoted at 145 and movable between stop pins 146 and 147 as will be more fully described below.

Means are provided for controlling the application of vacuum to the cylinder 39 in accordance with the speed of movement of the vehicle, and for this purpose a governor 50 is driven from the propeller shaft 11. The application of vacuum is, however, always subject to the control of the clutch pedal 15, and valve 115 is opened only when the clutch is disengaged. At its axially movable end, the governor is connected to a slide valve 51 which controls the application of vacuum to the cylinder 39. Valve 51 comprises a slide 52 slidable within a valve body 53 and formed with a plurality of valve passageways 54 and 55 adapted to selectively connect one or the other of valve ports 56, 57 or 58 with the valve port 59. With the governor in its stationary position, passageway 55 connects valve ports 57 and 59, while at a vehicle speed of from eight to fifteen miles per hour, the slide connects valve port 56 with port 59, and at higher speeds the port 58 is connected with port 59. Ports 57 and 58 are both connected with line 60 connected to one end of cylinder 39, while port 56 is connected to the other end of cylinder 39 through a line 61.

Means are also provided for positioning the pinion 29 axially in accordance with vehicle speed, so that at speeds above eight miles an hour, for instance, the pinion is in engagement with rack 28, while at lower speeds the pinion is in engagement with rack 27. As shown in Figure 1, the collar 49 of governor 50 is slidable on shaft 151 and is held in low speed position by springs 150 is also adapted to cooperate with a lever 65 pivoted on pin 165, connected to lever 45 by link 66. Lever 45 is provided with a projection 67 to cooperate with a detent 68 so as to move the lever suddenly from one position to the other under the influence of the governor 50. In the position shown, one of the springs 43 has been compressed and is ready to slide the pinion 29 axially to its other position when the rod 25 has been returned to neutral position by cylinder 39.

For automatically venting the cylinder 38 at one end as the piston moves towards the other end, automatic atmospheric relief ports are provided. As embodied, there is provided a relief port 70 at each end of the cylinder, and each port is connected to vent its own end of the cylinder and to be operated by the reduced pressure at the other end of the cylinder. For this purpose (Fig. 4) the relief port comprises a valve body 71 having an atmospheric port 72 and a port 73 opening into the cylinder 38, and a valve slide 76 normally closing the communication between ports 72 and 73. The valve slide is recessed and is moved against the compression of spring 74 by vacuum applied through line 75 connected to the other end of cylinder 38.

Manually controlled means are provided for selectively moving the gears to reverse, second speed, and neutral positions and a valve 80 manually operable by handle 180 is provided between the intake 21 and the selector valve 51, this valve 80 having an opening which may be connected with any one of the valve ports 81, 82 or 83. Port 82 corresponds to the normal position for automatic operation, and is connected by line 85 to selector valve 51, while valve port 83 is the neutral port and is connected by line 86 to the central portion of cylinder 38. Valve port 81 is for reverse or second speed, depending upon whether the vehicle is at rest or moving and is connected by line 88 to line 61.

In accordance with a modified form of the invention, means are provided for amplifying the power of the governor-controlled mechanism for axially moving the pinions 29. An illustrative form of this modification is shown in Fig. 5, in which the parts identical with those in Fig. 1 are similarly numbered, it being apparent that the only structural difference in the two forms of the invention lies in the connections between governor-actuated lever 45 and the pinion shaft 32.

In this modified form of the invention, the governor-controlled lever 45 operates a relay valve to control a vacuum-operated actuating motor comprising the vacuum cylinder 100 having slidable therein a piston 101, the rod of which is pivotally connected with the end of lever 102. The other end of said lever is connected by a fork 103 to the grooved collar 40 on the end of pinion shaft 32.

Connection is made to the cylinder 100 from the main vacuum line 85 through a conduit 105 which communicates with the interior of a cylindrical valve chamber 106. A conduit 107 communicates with the opposite side of the valve chamber near the upper end thereof, the lower end of said conduit entering the upper end of the cylinder 100. The opposite end of the cylinder 100 communicates with the lower portion of valve chamber 106 through conduit 108.

A valve slide 110 is mounted to oscillate within the chamber 106, the lower end of said slide being pivotally connected to the end of governor lever 45. The valve slide is provided with an upper port 111 and a lower port 112 separated by a central solid portion 113. The valve chamber or cylinder 106 is ported to the atmosphere at 115 opposite the conduit 107 and at 116 opposite the conduit 108.

The mechanism shown in Fig. 5 is in the same position as that in Fig. 1, that is, the gears are in first speed position and about to be shifted to second speed position. In this operation, the governor mechanism is tending to raise the left hand end of lever 45 and has moved valve slide 110 so that communication is established between conduit 105 and the upper end of cylinder 100 through port 111 and conduit 107. At the same time atmosphere port 115 remains blocked, while port 112 establishes communication between the lower end of the cylinder and atmosphere through conduit 108 and port 116. Thus piston 101 is about to be raised, tending to shift pinion 29 across finger 33 as soon as it has been oscillated into position.

It will be clear that a further increase in speed of the vehicle will tend to maintain the piston 101 in the position described, while a slowing down of the vehicle will restore the parts to the position shown in the drawings. With this construction the governor is not called upon to exercise any appreciable force, but merely serves as a control for the valve mechanism.

The invention in its broader aspects is not limited to the specific mechanisms shown and described but departures may be made therefrom within the scope of the accompanying claims without departing from the principles of the invention and without sacrificing its chief advantages.

What I claim is:

1. In a fluid pressure operated gear shifter for the selective operation of a plurality of shift rods, the combination of a reversible fluid pressure motor, racks connected to each shift rod, a pinion moved by the motor and a governor for shifting the pinion into engagement with one or the other rack.

2. In a fluid pressure operated gear shifter for the selective operation of a plurality of shift rods, the combination of a reversible fluid pressure motor, racks connected to each shift rod, a pinion moved by the motor and means for shifting the pinion into engagement with one or the other rack, a selector valve and a governor selectively controlling the valve for controlling the application of fluid pressure to the ends of the cylinder.

3. In a fluid pressure operated gear shifter for the power shifting of an automobile change-gear transmission, the combination of a reversible fluid pressure motor, a plurality of shift rods, a governor, a selector valve controlling the application of fluid pressure alternatively to one end or the other of the motor and moved directly by the governor, means for connecting the motor with either shift rod by the governor and manually operable means for applying fluid pressure directly to the motor independently of the selector valve.

4. In a fluid pressure operated gear shifter for the operation of a plurality of shift rods, one of said rods serving to shift the gears into reverse while another serves to shift the gears into a higher forward speed, the combination of a reversible fluid pressure operated motor, means for operatively connecting the motor with one or the other of the shift rods, fluid pressure means for shifting the connecting means, a vehicle driven governor, and means for controlling the application of fluid pressure to said motor and fluid pressure means, said fluid pressure means being under control of the governor, and manual control means controlling the application of fluid pressure to the motor independently of the governor, said manual and governor control means coacting to prevent shifting into reverse while the vehicle is above a certain forward speed.

5. In a fluid pressure operated gear shifter for the operation of a pair of shift rods, one of said rods serving to shift the gears into reverse and first speeds while another serves to shift the gears into higher forward speeds, the combination of a reversible fluid pressure operated motor, means for operatively connecting the motor with one or the other of the shift rods, fluid pressure means for shifting the connecting means, a vehicle driven governor, and means for controlling the application of fluid pressure to said motor and fluid pressure means, said fluid pressure means being under control of the governor, and manual control means controlling the application of fluid pressure to the motor independently of the governor, said manual and governor control means coacting to prevent shifting into reverse while the vehicle is above a certain forward speed.

HOBART N. DURHAM.